(12) United States Patent
Wolf

(10) Patent No.: US 10,828,980 B2
(45) Date of Patent: Nov. 10, 2020

(54) OPERATING FLUID CONTAINER SYSTEM FOR MOTOR VEHICLES AND METHOD FOR FILLING A FUEL CONTAINER OF AN OPERATING FLUID CONTAINER SYSTEM

(71) Applicant: KAUTEX TEXTRON GMBH & CO. KG, Bonn (DE)

(72) Inventor: Hartmut Wolf, Koenigswinter (DE)

(73) Assignee: KAUTEX TEXTRON GMBH & CO. KG, Bonn (DE)

( * ) Notice: Subject to any disclaimer, the term of this patent is extended or adjusted under 35 U.S.C. 154(b) by 127 days.

(21) Appl. No.: 15/768,145

(22) PCT Filed: Sep. 26, 2016

(86) PCT No.: PCT/EP2016/072839
§ 371 (c)(1),
(2) Date: Aug. 6, 2018

(87) PCT Pub. No.: WO2017/063854
PCT Pub. Date: Apr. 20, 2017

(65) Prior Publication Data
US 2018/0326838 A1 Nov. 15, 2018

(30) Foreign Application Priority Data

Oct. 13, 2015 (DE) .......................... 10 2015 219 858

(51) Int. Cl.
*B60K 15/035* (2006.01)
*G07C 5/08* (2006.01)
(Continued)

(52) U.S. Cl.
CPC ............ *B60K 15/035* (2013.01); *F01N 3/208* (2013.01); *F01N 3/2066* (2013.01); *F01N 9/00* (2013.01);
(Continued)

(58) Field of Classification Search
CPC ........ B60K 15/035; B60K 2016/03217; B60K 2015/03361; B60K 15/03504;
(Continued)

(56) References Cited

U.S. PATENT DOCUMENTS 5,044,397 A * 9/1991 Szlaga ............. B60K 15/03519
137/202
6,252,499 B1 * 6/2001 Gerdtz ................ G01F 23/0076
340/450.2

(Continued)

FOREIGN PATENT DOCUMENTS

DE 19901080 7/2000
DE 102010022559 12/2010
(Continued)

OTHER PUBLICATIONS

DE-102011108333-A1 English Translation of Specification (Year: 2013).*

(Continued)

*Primary Examiner* — Marina A Tietjen
*Assistant Examiner* — Stephanie A Shrieves
(74) *Attorney, Agent, or Firm* — Grossman, Tucker, Perreault & Pfleger, PLLC

(57) ABSTRACT

The present invention discloses an operating liquid container system, comprising a fuel container with a fuel fill level sensor, a urea container with a urea fill level sensor, and a tank control device which is connected to the fuel fill level sensor in order to receive data representing a fill level of the fuel container and to the urea fill level sensor in order to receive data representing a fill level of the urea container, wherein the tank control device is designed to determine, taking into consideration the data representing the fill level of the fuel container, a first distance that can be covered with the fuel quantity situated in the fuel container, wherein the (Continued)

tank control device is furthermore designed to determine, taking into consideration the data representing the fill level of the urea container, a second distance that can be covered with the urea quantity situated in the urea container, and wherein the tank control device is furthermore designed to output a warning signal if the first distance is longer than or equal to the second distance.

10 Claims, 1 Drawing Sheet

(51) Int. Cl.
  *F01N 3/20* (2006.01)
  *F01N 9/00* (2006.01)
  *B60K 15/03* (2006.01)
  *G01F 23/00* (2006.01)
  *G01F 22/00* (2006.01)

(52) U.S. Cl.
  CPC .. *G07C 5/0825* (2013.01); *B60K 2015/03217* (2013.01); *B60K 2015/03361* (2013.01); *B60K 2015/03576* (2013.01); *F01N 2610/02* (2013.01); *F01N 2610/142* (2013.01); *F01N 2610/148* (2013.01); *F01N 2610/1466* (2013.01); *F01N 2900/102* (2013.01); *F01N 2900/1814* (2013.01); *F01N 2900/1818* (2013.01); *G01F 22/00* (2013.01); *G01F 23/0092* (2013.01); *Y02A 50/2325* (2018.01); *Y02T 10/24* (2013.01); *Y02T 10/47* (2013.01)

(58) Field of Classification Search
  CPC ... B60K 15/0519; F01N 3/2066; F01N 3/208; F01N 9/00; F01N 2610/02; F01N 2610/142; F01N 2610/1466; F01N 2900/102; F01N 2900/1818; Y02T 10/24; Y02T 10/47; G01F 22/00; G01F 23/0092; G01F 23/00; G07C 5/0825; Y02A 50/2325; B67C 3/06
  USPC .......................................................... 141/95
  See application file for complete search history.

(56) References Cited

U.S. PATENT DOCUMENTS

| | | | | |
|---|---|---|---|---|
| 6,607,005 | B2* | 8/2003 | Viebahn | B60K 15/077 123/510 |
| 8,116,961 | B2* | 2/2012 | Bogema | F02D 41/0275 701/103 |
| 2002/0153374 | A1 | 10/2002 | Isobe | |
| 2006/0225709 | A1* | 10/2006 | Washeleski | B60K 15/03519 123/478 |
| 2007/0277508 | A1* | 12/2007 | Hendrickson | F01N 13/009 60/286 |
| 2011/0209789 | A1* | 9/2011 | Murabayashi | F02M 37/0094 137/899 |
| 2013/0319070 | A1 | 12/2013 | Klenk et al. | |
| 2015/0283505 | A1* | 10/2015 | Brooks | F01N 3/2066 252/182.34 |
| 2016/0060093 | A1* | 3/2016 | Criel | B60K 15/035 137/2 |

FOREIGN PATENT DOCUMENTS

| | | | |
|---|---|---|---|
| DE | 102011104384 | 12/2012 | |
| DE | 102011108333 A1 * | 1/2013 | ....... B60K 15/03504 |
| EP | 2889462 | 7/2015 | |
| EP | 2889462 A1 * | 7/2015 | ............ F01N 3/021 |
| KR | 20110065932 A * | 6/2011 | |
| WO | 2009/001195 | 12/2008 | |
| WO | WO-2009001195 A1 * | 12/2008 | ......... F01N 3/2066 |
| WO | WO-2014118248 A1 * | 8/2014 | ............. F01N 11/00 |

OTHER PUBLICATIONS

KR-20110065932-A English Translation of Specification (Year: 2020).*
English translation of International Search Report dated Dec. 23, 2016, received in corresponding PCT Application No. PCT/EP2016/072839.
Office Action from related Chinese Appln. No. 201680072894.2, dated Dec. 26, 2019. English translation attached.
Office Action from related Indian Appln. No. 201827017416, dated Dec. 17, 2019. English translation attached.

* cited by examiner

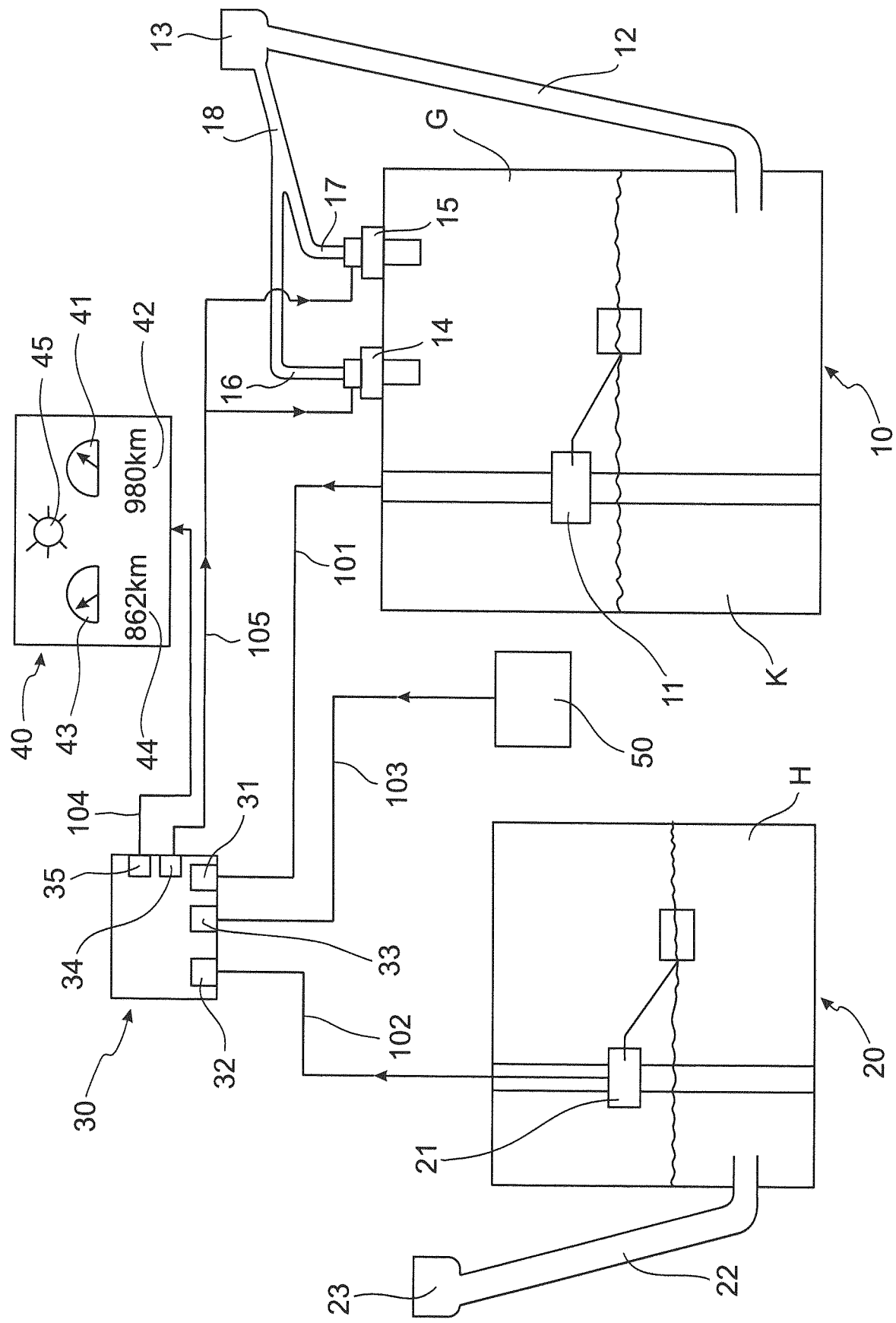

OPERATING FLUID CONTAINER SYSTEM FOR MOTOR VEHICLES AND METHOD FOR FILLING A FUEL CONTAINER OF AN OPERATING FLUID CONTAINER SYSTEM

FIELD

The present invention relates to an operating liquid container system for motor vehicles, wherein the operating liquid container system comprises a fuel container with a fuel fill level sensor and a urea container with a urea fill level sensor. The present invention also relates to a method for filling a fuel container of an operating liquid container system.

BACKGROUND

A motor vehicle having an internal combustion engine requires fuel in the form of gasoline or diesel fuel for the operation thereof, which fuel is carried on board the motor vehicle in the fuel container. Furthermore, in the case of motor vehicles with internal combustion engines, in particular with diesel engines, an aqueous urea solution is injected into the exhaust tract in order to reduce nitrogen oxides in exhaust gases of the motor vehicle. For this purpose, the motor vehicle has a urea container for storing the aqueous urea solution.

In order that the reduction of nitrogen oxides functions reliably, the motor vehicle must carry sufficient urea solution on board in the urea container at all times. If urea solution is no longer stored in the urea container, the nitrogen oxide emissions of the motor vehicle increase abruptly during the operation of the internal combustion engine with fuel, such that, for example, legally predetermined limit values of nitrogen oxide concentrations in the exhaust gas can be exceeded.

In order that sufficient urea solution is stored in the urea container, it is customary in the case of some motor vehicles that, during regular inspection visits after the motor vehicle has traveled a predetermined distance (for example 30,000 km since the last inspection), the urea container is fully filled with urea solution at an inspection workshop. Nevertheless, depending on the driving style, this may lead to the problem that the urea solution in the urea container is fully consumed before a distance between two inspection visits has been covered. This is because, in the case of a non-economical driving style, the urea solution consumption increases with the fuel consumption of the motor vehicle.

Furthermore, it is known from the prior art for a urea container to be filled by the driver of the motor vehicle himself or herself either by means of a dispensing installation and/or by means of a refilling pack, for example in the form of a Kruse bottle. For the driver, it is however difficult to estimate how much urea solution must be replenished in order to be able to cover a predetermined distance, such that it is often the case that all of the urea solution is consumed, whereby the nitrogen oxide emissions of the motor vehicle massively increase.

SUMMARY

The present invention is based on the object of providing an operating liquid container system which offers increased protection against the urea container running dry.

More specifically, the object on which the present invention is based is achieved by means of an operating liquid container system which comprises a fuel container with a fuel fill level sensor, a urea container with a urea fill level sensor, and a tank control device which is connected to the fuel fill level sensor in order to receive data representing a fill level of the fuel container and to the urea fill level sensor in order to receive data representing a fill level of the urea container. Here, in the case of the operating liquid container system according to the invention, the tank control device is designed to determine, taking into consideration the data representing the fill level of the fuel container, a first distance that can be covered with the fuel quantity situated in the fuel container. The tank control device is furthermore designed to determine, taking into consideration the data representing the fill level of the urea container, a second distance that can be covered with the urea quantity situated in the urea container. Furthermore, in the case of the operating liquid container system according to the invention, the tank control device is designed to output a warning signal if the second distance is shorter than or equal to the first distance.

The operating liquid container system according to the invention offers the advantage that it automatically identifies/determines when the first distance that can be covered with the fuel quantity contained in the fuel container is longer than the second distance that can be covered with the urea quantity contained in the urea container. Upon corresponding identification/determination, a warning signal is output, which may vary in nature. For example, the warning signal may be an acoustic warning signal. Furthermore, the warning signal may be transmitted to a display device, where said warning signal is visually displayed to the refueler/driver of the motor vehicle. If the refueler/driver of the motor vehicle is informed by means of the warning signal that not the entire distance that can be covered with the fuel quantity contained in the fuel container can be covered with urea solution being injected into the exhaust tract of the motor vehicle, he or she can initiate corresponding countermeasures. For example, the refueler/driver of the motor vehicle can, at a refueling station, replenish the urea solution in the urea container by means of a filling device (for example in the form of a dispensing installation). Furthermore, the driver/refueler of the motor vehicle may also take his or her motor vehicle to an inspection workshop in order to have the urea container filled with urea solution there. It is finally also possible for the refueler/driver of the motor vehicle to purchase a refilling pack and to refill the urea container by means of the urea pack.

The fuel container is designed for accommodating diesel fuel or gasoline or ethanol. The fuel fill level sensor is designed for determining a fill level of the fuel container. The fuel fill level sensor is preferably arranged in the fuel container. The urea fill level sensor is designed for determining a fill level of the urea container. The urea fill level sensor is preferably arranged in the urea container. The connection of the tank control device to the fuel fill level sensor may be realized by means of a first data line. The connection of the tank control device to the urea fill level sensor may be realized by means of a second data line. The connection of the tank control device to the display device may be realized by means of a third data line. The first data line, the second data line and the third data line may be wired or wireless data connections. The tank control device may be formed as a separate module. Furthermore, the tank control device may also be formed as part of an on-board electronic system of a motor vehicle.

The second distance that can be covered with the urea quantity situated in the urea container is to be understood in the sense that the urea quantity situated in the urea container is sufficient for urea solution to be injected into the exhaust tract of the motor vehicle, in an amount sufficient for the denitrification of the exhaust gas, over the entire second distance. For the determination of the first distance, it is for example possible for an average fuel consumption of the motor vehicle to be taken into consideration. This average fuel consumption may for example be read out from an on-board computer of the motor vehicle. For the determination of the second distance, consideration may also be given to an average urea consumption of the motor vehicle. This average urea consumption may for example be determined by means of the tank control device, or may also alternatively and/or additionally be read out from an on-board computer of the motor vehicle.

The operating liquid container system preferably furthermore comprises a display device which is connected to the tank control device for the transmission of the warning signal and/or of the data representing the fill level of the fuel container and/or of the data representing the fill level of the urea container. Here, the display device is designed to display the warning signal and/or the data representing the fill level of the fuel container and/or the fill level of the urea container.

The advantage of a correspondingly designed operating liquid container system is that the driver/refueler of the motor vehicle can be easily informed of the state in which the distance that can be covered with the fuel situated in the fuel container is longer than that with the urea quantity situated in the urea container.

The display device may have multiple analog display elements in the form of analog display instruments. Furthermore, the display device may for example take the form of light-based status bars. Furthermore, the display device may be formed by an LCD/TFT display device. For example, the display device may be designed so as to have a fill level display element for the fuel container. Furthermore, the display device may have a first range display element by means of which, for example, the range that can be covered with the fuel contained in the fuel container can be numerically displayed. Furthermore, the display device may have a fill level display element for the urea container. Furthermore, the display device may have a second range display element by means of which the range that can be covered with the urea solution contained in the urea container can be displayed. Finally, the display device may have a display element for the warning signal. It displays elements the warning signal may for example take the form of a signal lamp.

Alternatively, the display device may also take the form of a mobile terminal, for example a mobile telephone/smartphone. In this case, the warning signal and preferably also the data representing the fill levels of the fuel container and/or of the urea container are displayed on the mobile terminal.

The operating liquid container system is furthermore preferably designed such that the display device is arranged in a vehicle interior compartment, in particular in/on a dashboard of a motor vehicle, and/or in/on a filler-neck compartment and/or in/on a tank flap. In particular, the display device may be arranged on an inner side of a tank flap.

A correspondingly designed operating liquid container system offers the advantage that the data required for determining whether the distance that can be covered with the fuel quantity contained in the fuel container can be covered in full with urea solution being injected into the exhaust tract of the motor vehicle are even more readily apparent to the driver/refueler.

In one advantageous refinement of the operating liquid container system, the tank control device is designed to receive not only the data transmitted by the fuel fill level sensor and by the urea fill level sensor but also further data representing an inclination of the operating liquid container system. Here, the tank control device is designed to determine an actual fill level of the fuel container and an actual fill level of the urea container by means of the data transmitted by the fuel fill level sensor and by the urea fill level sensor and the data representing the inclination of the operating liquid container system.

The actual fill level corresponds to the fill level of the corresponding operating liquid container (that is to say the nominal fill level of the operating liquid container) when the operating liquid container has no inclination, that is to say when the motor vehicle is positioned on level ground without an inclination. In the present case, an operating liquid container is to be understood to mean a fuel container or a urea container. The relationship between the fill level sensor signal, the data representing the inclination of the operating liquid container, and the actual degree of filling of the operating liquid container (actual fill level) is preferably stored in a corrective characteristic map which is preferably stored in the tank control device.

The measurement of the spatial position of the motor vehicle or of the operating liquid container is preferably performed using a position sensor inherent in the vehicle. For the generation of the corrective characteristic map, the operating liquid container may for example be inclined about a horizontal axis in 5° steps, wherein, in each oblique position, the operating liquid container is rotated through 360° about the vertical axis in 5° steps. Here, at each of these oblique-position and rotation points, a level-volume characteristic curve is generated and recorded in the corrective characteristic map. The corrective characteristic map then serves for the determination of the exact operating liquid quantity situated in the operating liquid container. Temperature variations of the fuel may also be taken into consideration in the corrective map.

A correspondingly designed operating liquid container system offers the advantage that the actual degrees of filling of the fuel container and of the urea container can be determined with yet greater accuracy.

The operating liquid container system is furthermore preferably designed so as to also comprise an inclination sensor by means of which the inclination of the fuel container and/or of the urea container can be determined. Here, the inclination sensor is connected to the tank control device in order to transmit data representing the inclination of the fuel container and/or the inclination of the urea container to the tank control device.

In an advantageous refinement of the operating liquid container system, the fuel container comprises at least one electrically and/or electromagnetically and/or electromechanically actuatable actuator by means of which an ending of a filling process of the fuel container can be initiated. Here, the tank control device is connected to the actuator in order to transmit signals to the actuator. Here, the tank control device is designed to transmit a filling stop signal to the actuator if the first distance is equal to and/or longer than the second distance.

A correspondingly designed operating liquid container system offers the advantage that a filling process of the fuel container is automatically stopped when the fuel quantity situated in/introduced into the fuel container corresponds to the fuel quantity required for covering the second distance. It is consequently achieved that, after a filling process of the fuel container, with the fuel quantity situated in the fuel container, it is possible to cover only the distance for which it can be ensured that the urea solution situated in the urea container can be injected into the exhaust tract, such that denitrification of the exhaust gases remains ensured, over the entire distance. If the driver of the motor vehicle stops for example at a refueling station which sells fuel but not urea solution, the driver of the motor vehicle can simply start the filling process of the fuel container, wherein the operating liquid container system automatically ends the filling process of the fuel container. It is thus made certain for the driver of the motor vehicle that, with the fuel quantity situated in the fuel container after the filling process of said fuel container, the motor vehicle can cover a distance for which the urea quantity situated in the urea container is sufficient to ensure denitrification of the exhaust gas.

The at least one actuator is preferably formed as an operational and/or refueling vent valve which is arranged in the fuel container. The operational and/or refueling vent valve is electrically and/or electromagnetically and/or electromechanically actuatable between an open position and a closed position. In the open position of the operational and/or refueling vent valve, the fuel container is fluidically connected by means of the operational and/or refueling vent valve to a vent line. By contrast, in the closed position of the operational and/or refueling vent valve, the fuel container is fluidically separated from the vent line by means of the operational and/or refueling vent valve.

The use of the operational and/or refueling vent valve for ending a filling process offers the advantage that valve devices that are required in any case for the operation of the fuel container are used for electrically and/or electromagnetically and/or electromechanically ending the refueling process, such that no further components have to be installed in the fuel container, whereby the complexity of the correspondingly designed operating liquid container system is not increased.

The operating liquid container system is preferably designed such that the at least one actuator is formed as a check valve which is arranged in a filler pipe which opens into the fuel container. Here, the check valve is electrically and/or electromagnetically and/or electromechanically actuatable/adjustable between an open position and a closed position, wherein, in the open position of the check valve, the fuel container is fluidically connected to the filler pipe, and wherein, in the closed position of the check valve, the fuel container is fluidically separated from the filler pipe by means of the check valve, or the clear width of the filler pipe is reduced by means of the check valve.

The operating liquid container system is furthermore preferably formed such that the at least one actuator is formed as an obstruction body which is arranged in a filler pipe which opens into the fuel container, wherein the obstruction body is electrically and/or electromagnetic the and/or electromechanically actuatable between an open position and an obstruction position, wherein, in the open position of the obstruction body, a clear width of the filler pipe is not reduced, and wherein, in the obstruction position of the obstruction body, said obstruction body projects into the filler pipe and reduces the clear width of the filler pipe.

The operating liquid container system is furthermore preferably designed such that the at least one actuator is formed as an electromagnet which is arranged in a filler neck of a filler pipe which opens into the fuel container, wherein the electromagnet is actuatable/adjustable between an active state and a passive state. Activating the electromagnet causes a dispensing valve inserted into the filler pipe to be closed, or activation of the electromagnet causes a dispensing valve to be opened.

The three embodiments of the operating liquid container system described immediately above offer the advantage that, to end the filling process, it is not necessary for an internal pressure to be built up in the fuel container, such that, after the end of the filling process, the fuel container is substantially unpressurized. Since no internal pressure is built up, the fuel container does not expand, such that the accuracy of the determination of the fuel quantity in the fuel container is increased. Furthermore, the fact that no pressure has to be built up in the fuel container in order to end the filling process offers the advantage that the fuel quantity introduced into the fuel container corresponds more precisely to the fuel quantity that is intended to be introduced into the fuel container. This is because the gas volume that remains in the fuel container does not function as a compressible gas spring. The quantity of the fuel introduced into the filler pipe can be determined very accurately, such that the accuracy of the fuel quantity introduced is increased.

In a further preferred embodiment, the operating liquid container system is designed such that the at least one actuator is formed as a shut-off valve which is arranged between the fuel container and an activated carbon filter and/or between an activated carbon filter and the atmosphere. The shut-off valve is electrically and/or electromagnetically and/or electromechanically actuatable/adjustable between an open position and a closed position, wherein, in the open position of the shut-off valve, the fuel container is fluidically connected by means of the shut-off valve to the activated carbon filter or to the atmosphere, and wherein, in the closed position of the shut-off valve, the fuel container is fluidically separated from the activated carbon filter or from the atmosphere by means of the shut-off valve.

The operating liquid container system is furthermore preferably designed such that the tank control device has a signal transmission unit for the wireless transmission of signals to a filling device.

It is thus possible by means of the tank control device for a filling stop signal, for example, to be transmitted to the filling device, whereupon the filling device ends the filling process.

In a further advantageous refinement of the operating liquid container system, the latter furthermore comprises a quality sensor for determining a concentration of the urea fraction of the urea solution situated in the urea container. The tank control device is designed to determine the concentration of the urea fraction of the urea solution situated in the urea container by means of the quality sensor before and after a filling process of the urea container. The tank control device is furthermore designed to determine the quantity of the urea solution situated in the urea container by means of the urea fill level sensor before and after a filling process of the urea container. The tank control device is furthermore designed to calculate the concentration of the urea fraction of the urea solution introduced during the filling process by forming the quotient of the product of the concentration of the urea solution before the filling process with the operating liquid quantity before the filling process, with the operating liquid quantity after the filling process.

Furthermore, the object on which the present invention is based is achieved by means of a method for filling a fuel container of an operating liquid container system. More specifically, the object on which the present invention is based is by means of a method for filling a fuel container of an operating liquid container system, which comprises a urea container in addition to said fuel container, for a motor vehicle, wherein the method comprises the following method steps:

determining a fill level of the fuel container;
determining a first distance that can be covered by the motor vehicle with the fuel situated in the fuel container;
determining a fill level of the urea container;
determining a second distance that can be covered by the motor vehicle with the urea solution situated in the urea container, with the urea solution being injected into an exhaust tract of the motor vehicle; and
outputting a warning signal if the first distance is longer than or equal to the second distance.

BRIEF DESCRIPTION OF THE DRAWINGS

Further advantages, details and features of the invention will emerge below from the exemplary embodiment discussed. In the figures:

FIG. 1 is a schematic illustration of an operating liquid container system according to the invention.

DETAILED DESCRIPTION

In the description that follows, the same reference designations are used to denote identical components or identical features, such that a description given regarding a component with reference to one FIGURE also applies to the other figures, such that a repeated description will be omitted.

FIG. 1 schematically shows an operating liquid container system according to the invention, which comprises a fuel container 10 for accommodating fuel K and a urea container 20 for accommodating aqueous urea solution H. The fuel container 10, which may be designed for accommodating gasoline or in particular for accommodating diesel fuel, comprises a fuel fill level sensor 11. In the exemplary embodiment illustrated, the fuel fill level sensor 11 has a float body which floats on the fuel K, by means of the position of which float body a fill level of the fuel K in the fuel container 10 can be determined. The urea container 20 comprises a urea fill level sensor 21, which in the exemplary embodiment illustrated likewise has a float body which floats on the aqueous urea solution, by means of the position of which float body a fill level of the aqueous urea solution H in the urea container 20 can be determined.

The fuel container 10 can be filled with fuel K, via a filler pipe 12 which opens into the fuel container 10, by means of a dispensing valve (not illustrated in FIG. 1) that can be inserted into a filler neck 13 of the filler pipe 12. Furthermore, the urea container 20 can be filled with aqueous urea solution H, via a filler pipe 22 which opens into the urea container 20, by means of a dispensing valve (not illustrated in FIG. 1) or by means of a refilling pack, which can be inserted into a filler neck 23 of the filler pipe 22.

It can also be seen from FIG. 1 that the operating liquid container system according to the invention also comprises a tank control device 30. Here, the tank control device 30 is connected to the fuel fill level sensor 11 by means of a first data line 101 in order to receive data representing a fill level of the fuel container 10. For this purpose, the tank control device 30 has a first data receiving unit 31. The tank control device 30 is furthermore connected to the urea fill level sensor 21 by means of a second data line 102 in order to receive data representing a fill level of the urea container 20. For this purpose, the tank control device 30 has a second data receiving unit 32.

In the exemplary embodiment illustrated in FIG. 1, the operating liquid container system furthermore has a display device 40, which is connected to the tank control device 30 by means of a fourth data line 104 for the transmission of data to the display device 40. For this purpose, the tank control device 30 has a second data output unit 35, which can also be referred to as second signal output unit 35.

The tank control device 30 is designed to determine, taking into consideration the data representing the fill level of the fuel container 10, a first distance that can be covered with the fuel quantity situated in the fuel container 10. In the determination of this first distance, consideration may be given to an average consumption of the motor vehicle in which the operating liquid container system according to the invention is installed, for example from an on-board computer. The tank control device 30 is furthermore designed to determine, taking into consideration the data representing the fill level of the urea container 20, a second distance that can be covered with the urea quantity situated in the urea container 20. Here, the second distance that can be covered with the urea solution situated in the urea container 20 is to be understood in the sense that the urea solution situated in the urea container 20 is sufficient for aqueous urea solution K to be injected into the exhaust tract of the motor vehicle, in an amount sufficient for the denitrification of the exhaust gas, over the entire second distance. Here, the tank control device 30 is designed such that a warning signal is output if the second distance is shorter than or equal to the first distance. Here, the warning signal is transmitted via the second data output unit 35 and by means of the fourth data line 104 to the display device 40.

It can be seen from FIG. 1 that the display device 40 has a fuel fill level display element 41 for displaying the fuel quantity situated in the fuel container 10. Furthermore, the display device 40 has a first range display element 42, which displays the distance that can be covered with the fuel K situated in the fuel container 10. In the exemplary embodiment illustrated, the calculated distance that can be covered with the fuel K situated in the fuel container 10 is 980 km. The display device 40 furthermore has a urea solution fill level display element 43 which is designed for displaying the amount of aqueous urea solution H situated in the urea container 20. Furthermore, the display device 40 has a second range display element 44 which displays the distance that can be covered with the urea solution situated in the urea container 20. In the exemplary embodiment illustrated, the calculated distance that can be covered with the urea H situated in the urea container 20 is 862 km. This means that, in the urea container 20, there is stored an amount of aqueous urea solution H which is such that a distance of 862 km can be covered with the aqueous urea solution H being injected into an exhaust tract of the motor vehicle. Consequently, the first distance is longer than the second distance, such that, by means of the tank control device 30, the warning signal is transmitted to the display device 40 via the second data output unit 35 and via the fourth data line 104. For displaying the warning signal, the display device 40 has a display element 45 which, in the exemplary embodiment illustrated, is in the form of a warning lamp 45.

A warning signal is thus displayed to the refueler of the fuel container 10, such that the refueler is informed that the urea container 20 does not contain sufficient aqueous urea solution H for aqueous urea solution to be injected into the exhaust tract, for denitrification of the exhaust gas, over the entire first distance of 980 km.

The display device 40 may be installed in a vehicle interior compartment, in particular in/on a dashboard of the motor vehicle. Furthermore, the display device 40 may also be arranged in/on a filler-neck compartment and/or in/on a tank flap. In particular, the display device 40 may be arranged on an inner side of a tank flap. Alternatively, and/or in addition, the display device 40 may also take the form of a mobile terminal, for example a mobile telephone/smartphone. In this case, the warning signal and preferably also the data representing the fill levels of the fuel container 10 and/or of the urea container 20 are displayed on the mobile terminal.

In the exemplary embodiment illustrated, the operating liquid container system furthermore comprises an inclination sensor 50 by means of which the inclination of the fuel container 10 and/or of the urea container 20 can be determined. The inclination sensor 50 is connected to the tank control device 30 by means of a third data line 103, wherein the third data line 103 is connected to a third data receiving unit 33 of the tank control device 30. Consequently, the tank control device 30 is furthermore designed to receive not only the data transmitted by the fuel fill level sensor 11 and by the urea fill level sensor 21 but also further data representing an inclination of the operating liquid container system. Here, the tank control device 30 determines an actual fill level of the fuel container 10 and an actual fill level of the urea container 20 by means of the data transmitted by the fuel fill level sensor 11 and by the urea fill level sensor 21 and the data representing the inclination of the operating liquid container system. The fill levels of the fuel container 10 and of the urea container 20 can thus be determined accurately even if the operating liquid container system is in an oblique position.

In the illustrated exemplary embodiment of the operating liquid container system, the fuel container 10 has an actuator 14 in the form of an operational vent valve 14 and an actuator 15 in the form of a refueling vent valve 15. The operational vent valve 14 is fluidically connected via an operational vent line 16 and a vent line 18 to the filler neck 13 of the fuel container 10. The refueling vent valve 15 is fluidically connected via a refueling vent line 17 and a vent line 18 likewise to the filler neck 13 of the fuel container 10. The operational vent line 16 and the refueling vent line 17 each open into the vent line 18.

In the exemplary embodiment illustrated, the operational vent valve 14 and/or the refueling vent valve 15 are/is electrically and/or electromagnetically and/or electromechanically adjustable between an open position and a closed position. In the open position of the operational vent valve 14 and/or of the refueling vent valve 15, the fuel container 10 is fluidically connected to the vent line 18 and thus to the filler neck 13. In the closed position of the operational vent valve 14 and of the refueling vent valve 15, the fuel container 10 is, by contrast, fluidically separated from the vent line 18 and thus from the filler neck 13.

The tank control device 30 may be designed to transmit a filling stop signal to the operational vent valve 14 and/or to the refueling vent valve 15 if the first distance is equal to and/or longer than the second distance. When the filling stop signal is received, the operational vent valve 14 and/or the refueling vent valve 15 are/is transferred into their/its closed position, such that venting of the fuel container 10 is interrupted. Consequently, during continued filling of the fuel tank 10 with fuel K, the pressure within the fuel tank 10 increases, such that a fuel column in the filler pipe 12 rises, until a deactivation opening of a dispensing valve (not illustrated in FIG. 1) is reached, whereupon an outflow of fuel from the dispensing valve is ended.

By means of a corresponding design of the operating liquid container system, it can be achieved that filling of the fuel container 10 is automatically ended when the distance that can be covered with the quantity of fuel then situated in the fuel container 10 at most corresponds to the distance for which sufficient urea solution H is stored in the urea container 20. It is self-evidently possible after this automatic ending of the filling process for the filling process to be manually continued by the refueler, wherein, for this purpose, at least the refueling vent valve must be transferred back into its open position. This may be performed automatically.

LIST OF REFERENCE DESIGNATIONS

10 Fuel container/motor vehicle tank
11 Fuel fill level sensor
12 Filler pipe (of the fuel container)
13 Filler neck (of the fuel container)
14 Actuator/operational vent valve
15 Actuator/refueling vent valve
16 Operational vent line
17 Refueling vent line
18 Vent line
20 Urea container/SCR container
21 Urea fill level sensor
22 Filler pipe (of the urea container)
23 Filler neck (of the urea container)
30 Tank control device/tank controlling device
31 (First) data receiving unit/signal receiving unit
32 (Second) data receiving unit/signal receiving unit
33 (Third) data receiving unit/signal receiving unit
34 (First) data output unit/signal output unit
35 (Second) data output unit/signal output unit
40 Display device
41 Fill level display element for fuel container
42 First range display element
43 Fill level display element for urea container
44 Second range display element
45 Display element for warning signal
50 Inclination sensor
101 (First) data line
102 (Second) data line
103 (Third) data line
104 (Fourth) data line
105 (Fifth) data line
G Gas volume (in the operating liquid container/motor vehicle tank)
H Urea solution (in the urea container)
K Fuel (in the fuel container)

What is claimed is:

1. An operating liquid container system, comprising:
a fuel container with a fuel fill level sensor;
a urea container with a urea fill level sensor;
a first filler pipe, which opens into the fuel container, by which the fuel container is fillable with fuel;
a second filler pipe, which opens into the urea container, by which the urea container is fillable with urea solution;
a tank control device connected to the fuel fill level sensor to receive data representing a fill level of the fuel container with fuel, and connected to the urea fill level sensor to receive data representing a fill level of the urea container with urea solution;

wherein the tank control device determines, taking into consideration the data representing the fill level of the fuel container with the fuel, a first distance that is coverable with a fuel quantity in the fuel container;

wherein the tank control device determines, taking into consideration the data representing the fill level of the urea container with the urea solution, a second distance that is coverable with a urea solution quantity in the urea container;

wherein the tank control device outputs a warning signal if the second distance is shorter than or equal to the first distance;

wherein the fuel container comprises at least one actuator, the at least one actuator electrically and/or electromagnetically and/or electromechanically actuatable by which an ending of a filling process of the fuel container is initiatable;

wherein the tank control device is connected to the actuator to transmit signals to the actuator; and wherein the tank control device transmits a filling stop signal to the actuator if the first distance is equal to or longer than the second distance.

2. The operating liquid container system of claim 1, further comprising:

a display device connected to the tank control device to transmit the warning signal and/or the data representing the fill level of the fuel container with the fuel and/or the data representing the fill level of the urea container with the urea solution; and wherein the display device displays the warning signal and/or the data representing the fill level of the fuel container with the fuel and/or the data representing the fill level of the urea container with the urea solution.

3. The operating liquid container system of claim 2, wherein the display device is arranged in a vehicle interior compartment and/or in/on a filler-neck compartment and/or in/on a tank flap.

4. The operating liquid container system of claim 1, wherein:

the tank control device receives data representing an inclination of the operating liquid container system; and wherein the tank control device determines an actual fill level of the fuel container with the fuel and an actual fill level of the urea container with the urea solution by the data transmitted by the fuel fill level sensor and the data transmitted by the urea fill level sensor, respectively, and the data representing the inclination of the operating liquid container system.

5. The operating liquid container system of claim 4, further comprising:

an inclination sensor; and the inclination sensor is connected to the tank control device to transmit the data representing the inclination of the operating liquid container system to the tank control device.

6. The operating liquid container system of claim 5 wherein the data representing the inclination of the operating liquid container system comprises at least one of data representing an inclination of the fuel container and data representing an inclination of the urea container.

7. The operating liquid container system of claim 1 wherein:

the at least one actuator is formed as an operational and/or refueling vent valve arranged in the fuel container;

the operational and/or refueling vent valve is electrically and/or electromagnetically and/or electromechanically actuatable between an open position and a closed position;

in the open position of the operational and/or refueling vent valve, the fuel container is fluidically connected by the operational and/or refueling vent valve to a vent line; and in the closed position of the operational and/or refueling vent valve, the fuel container is fluidically separated from the vent line by the operational and/or refueling vent valve.

8. The operating liquid container system of claim 1, further comprising:

a quality sensor;

wherein the tank control device determines a concentration of a urea fraction of a urea solution in the urea container by the quality sensor before and after a filling process of the urea container with urea solution; and wherein the tank control device determines the quantity of the urea solution in the urea container by the urea fill level sensor before and after the filling process of the urea container with urea solution.

9. A method for filling a fuel container of an operating liquid container system, which comprises a urea container in addition to said fuel container, for a motor vehicle, wherein the method comprises the following method steps:

determining a fill level of fuel in the fuel container;

determining a first distance that is coverable by the motor vehicle with the fuel in the fuel container;

determining a fill level of a urea solution in the urea container;

determining a second distance that is coverable by the motor vehicle with the urea solution in the urea container, with the urea solution being injected into an exhaust tract of the motor vehicle;

outputting a warning signal if the second distance is shorter than or equal to the first distance; and transmitting a filling stop signal which ends a filling process of the fuel container if the first distance is equal to or longer than the second distance.

10. The operating liquid container system of claim 8, further comprising:

wherein the tank control device calculates the concentration of the urea fraction of the urea solution introduced during the filling process from the concentration of a urea fraction of a urea solution in the urea container before and after a filling process of the urea container with urea solution.

* * * * *